(12) United States Patent
Slattery et al.

(10) Patent No.: US 8,108,258 B1
(45) Date of Patent: Jan. 31, 2012

(54) METHOD AND APPARATUS FOR RETURN PROCESSING IN A NETWORK-BASED SYSTEM

(75) Inventors: James A. Slattery, McKinney, TX (US); Matthew E. Gerde, The Colony, TX (US); Jeffrey M. Wolfe, Parrish, FL (US)

(73) Assignee: Intuit Inc., Mountain View, CA (US)

( * ) Notice: Subject to any disclaimer, the term of this patent is extended or adjusted under 35 U.S.C. 154(b) by 1172 days.

(21) Appl. No.: 11/669,552

(22) Filed: Jan. 31, 2007

(51) Int. Cl.
*G06Q 20/00* (2006.01)
(52) U.S. Cl. ............................................ 705/19; 705/31
(58) Field of Classification Search ................... 705/19, 705/31
See application file for complete search history.

(56) References Cited

U.S. PATENT DOCUMENTS

| | | | |
|---|---|---|---|
| 6,401,079 B1* | 6/2002 | Kahn et al. ................ | 705/30 |
| 6,895,472 B2 | 5/2005 | Neiman et al. | |
| 7,103,628 B2 | 9/2006 | Neiman et al. | |
| 7,234,103 B1* | 6/2007 | Regan ........................ | 715/234 |
| 7,243,121 B2 | 7/2007 | Neiman et al. | |
| 7,895,097 B2* | 2/2011 | Dang et al. ................. | 705/31 |
| 2004/0078271 A1* | 4/2004 | Morano et al. ............. | 705/19 |
| 2004/0078755 A1* | 4/2004 | Shinjo et al. ............... | 715/505 |
| 2004/0088233 A1* | 5/2004 | Brady et al. ................ | 705/31 |
| 2005/0081083 A1 | 4/2005 | Polan | |
| 2006/0085304 A1* | 4/2006 | Buarque De Macedo et al. ............................ | 705/31 |
| 2006/0195508 A1 | 8/2006 | Bernardin et al. | |

\* cited by examiner

*Primary Examiner* — Thomas Mansfield
(74) *Attorney, Agent, or Firm* — Osha • Liang LLP

(57) ABSTRACT

Method and apparatus for return processing, including tax returns. A return calculation mechanism may partition out return preparation jobs to a plurality of return calculation nodes. A job scheduler may receive returns and distribute the returns among the calculation nodes according to a load-balancing scheme. The job scheduler may decompose a return into two or more calculation jobs. A job may be an individual return or portion of a return. In one embodiment, the calculation jobs may be prioritized according to dependency. If one job depends on results of another job, the job may be scheduled to execute after the job on which it depends. The calculation nodes may cache calculated data from jobs, and a job that depends on another job may be assigned to a node that caches data from the job on which it depends.

31 Claims, 7 Drawing Sheets

METHOD AND APPARATUS FOR RETURN PROCESSING IN A NETWORK-BASED SYSTEM

BACKGROUND

Various regulatory authorities or agencies may require the preparation and filing of return-type documents by individuals, businesses, corporations, or other entities. For example, the Securities and Exchange Commission (SEC) may require individual or corporate investors and agents to file 10K and 10Q reports concerning investment activities. As another example, a governmental entity, e.g., a Federal, State, county, city, district, and/or other municipality (hereinafter collectively referred to as tax authorities), may require individuals, businesses, corporations, or other taxable entities to file various tax returns. Return preparation software programs, which may include network-based programs, are available that assist preparers in preparing various returns, statements, and other forms and documents for filing by or on behalf of an entity with regulatory authorities or agencies.

An example of a return preparation software programs are network-based tax preparation software programs. Network-based tax preparation software programs (hereinafter referred to as "tax programs") are available that assist tax preparers in preparing tax returns and other tax forms and documents for filing by or on behalf of a taxable entity with tax authorities. These network-based tax programs may guide the tax preparer through tax return preparation and filing processes for various tax authorities, and may automatically perform at least some necessary tax preparation activities in accordance with data input and forms, schedules, tax data, tables, and formulas stored with or coded into the tax program. Personal, professional, and business or corporate versions of network-based tax programs may be provided. Professional versions may be used by tax preparation professionals to prepare various tax returns for multiple taxable entities, which may include individuals, businesses, and corporations. Corporate versions may be used by corporations to prepare various corporate tax returns for multiple taxable entities. Note that corporations may have tax departments, and corporate versions of network-based tax programs may include both hardware and software that is installed and operated, for example in a corporate network or intranet, for the purpose of preparing corporate tax returns. Further, network-based tax programs may be used to prepare annual taxes, quarterly taxes, etc for filing with various tax authorities by or on behalf of taxable entities.

Typically, the tax preparer(s) will enter necessary data and information via a user interface of the network-based tax program, and, when done, access the user interface to direct the tax program to complete the tax return under preparation. The tax program may perform any necessary calculations using the entered data and information and in accordance with tax formulas relevant to the particular tax return under preparation (e.g. Federal tax return, State tax return, local tax return, etc.), and possibly data and information from other sources such as previous tax returns or other tax-related documents, to generate appropriate calculated values for certain fields of the tax return under preparation.

Some corporations may include multiple taxable entities, such as divisions, sub-corporations, and wholly are partly owned subsidiaries. These corporations may be required by various tax authorities to file consolidated tax returns that incorporate the tax return information from tax returns prepared for the multiple taxable entities within the corporation. Thus, corporate network-based tax programs may be required to calculate tax returns for individual taxable entities and consolidated tax returns. In addition, some corporations may require not only the preparation of corporate-level, consolidated tax returns, but also the preparation of other tax returns and tax documents for individual entities such as shareholders or partners, whether individuals or corporations themselves.

The calculation of consolidation-type tax returns poses significant problems in the processing of tax returns by network-based tax programs. Similarly, the processing of high volumes of individual tax returns poses significant problems to network-based tax programs. Both the processing of large consolidation-type returns and high volumes of individual tax returns require large amounts of computing resources, neither can tolerate significant failures, and both are expected by consumers to produce results in short time frames. In addition, in the case of the consolidation-type returns, there may be significant dependencies between lower level tax returns or tax calculation subtasks that may restrict the flow of the calculations. Further, changes or recalculations at a lower level on which other levels are dependent may require an entire consolidation to be recalculated.

In conventional network-based return preparation programs, such as the network-based tax programs described above, a client is typically routed to a particular server, and remains on that server for the duration of the session. The client's data entry into the return and the resulting return calculations are performed on that server. The calculations are not spread among servers, and the servers are not easy to scale. Each server can handle only a certain number of clients and the processing of a certain number of returns. Typically, in conventional network-based return preparation programs, one server cannot offload tasks to other servers.

SUMMARY

Various embodiments of a method and apparatus for return processing are described. Although the descriptions provided herein are generally given in reference to the preparation of tax returns, the method and apparatus described herein may be applied to the preparation and filing of return-type documents by individuals, businesses, corporations, or other entities with any type of regulatory authority or agency.

In embodiments, a return calculation mechanism may be provided that distributes return calculation jobs among a plurality of return calculation nodes. A job scheduler may be provided that receives tax information (such as tax returns) from one or more sources and allocates and distributes the return calculation jobs among the plurality of return calculation nodes according to a load-balancing scheme. The job scheduler may decompose tax return calculations into units of work, or return calculation jobs. A return calculation job may be the calculation of an individual tax return in its entirety, a calculation of a part or portion of a tax return, or one or more calculations performed for several returns. For example, large, complex tax returns such as corporate consolidated tax returns may be broken into units of work or return calculation jobs. In one embodiment, calculation results from return calculation jobs completed on the return calculation nodes may be returned to the job scheduler. In one embodiment, calculation results from return calculation jobs completed on one or more return calculation nodes may be provided to other nodes.

In one embodiment, the job scheduler may allocate and/or prioritize return calculation jobs based on the complexity of the calculations and the resources available on available tax preparation node(s) to perform the calculations. In one embodiment, the return calculation jobs that are units of a decomposed tax return calculation, such as a decomposed consolidated tax return, may be prioritized by the job scheduler according to a dependency ordering scheme. In one embodiment, return calculation nodes may each store a local cache of recently calculated tax data. When new return calculation jobs are scheduled that depend on other return calculation jobs, the job scheduler may assign those jobs to return calculation nodes on which the local cache contains one or more portions of data from previous jobs that the new jobs depend on.

If there are dependencies among the return calculation jobs, one return calculation job may be scheduled by the job scheduler to wait for another return calculation job on which the first return calculation job depends to be completed. The return calculation mechanism may determine the dependencies, keep track of the dependencies and the status of the return calculation jobs, queue a return calculation job in a wait state for a dependency on another return calculation job, and release the queued return calculation job once the return calculation job it depends on has completed. In one embodiment, a return calculation node may discover one or more dependencies of a return calculation job submitted to the return calculation node on one or more other return calculation jobs, and may notify the job scheduler of those dependencies. The job scheduler may also prioritize the scheduling of the other return calculation job(s) so that the job(s) are allocated to return calculation nodes for processing as soon as possible.

Embodiments of the return calculation mechanism may provide load balancing, scalability and failover capabilities. The job scheduler may track the status and loads of the return calculation nodes, and allocate return calculation jobs to the return calculation nodes according to a load-balancing scheme. New computers may be added to the return calculation mechanism and recognized automatically by the job scheduler as return calculation nodes, and return calculation jobs may be allocated to the new return calculation nodes according to the load-balancing scheme. Note that the dependency ordering scheme mentioned above may be integrated in the load-balancing scheme, so that dependencies are considered when allocating jobs to the return calculation nodes. Return calculation nodes that fail to respond, for example to status and job requests from the job scheduler, for a specified period may be removed from the return calculation mechanism automatically. Any tax calculations jobs previously allocated to a failed return calculation node and not completed may be re-allocated to one or more other return calculation nodes. In one embodiment, one or more failover job schedulers may be provided, and a failover job scheduler may take over the responsibility of job scheduling if the job scheduler fails for some reason.

Embodiments of the return calculation mechanism as described herein may be implemented to support any kind of tax program, whether desktop or network-based, as a backend tax calculation solution. Embodiments of the return calculation mechanism may be implemented as back-end tax calculation solutions in data centers for desktop or network-based tax programs offered to personal, professional, and/or business users as a tax processing service over the internet and which may need to process thousands or even millions of individual tax returns. Embodiments of the return calculation mechanism may also be implemented in enterprise environments, for example in the tax departments of corporations that may have many subsidiary entities, including but not limited to partially or wholly owned companies. In corporate environments, embodiments of the return calculation mechanism may, for example, be implemented as backend tax calculation solutions in enterprise tax systems installed in the corporate network environment.

Embodiments of the return calculation mechanism may help tax processing centers, whether those of internet-based tax processing services or corporate tax departments, to leverage the hardware the centers have available as best they can. Computers can be added to or removed from the return calculation mechanism as needed to support the tax calculation load. Further, the return calculation mechanism may partition or decompose tax returns into units of work and load-balance the units of work across return calculation nodes to best utilize the processing power of the nodes. By dividing the tax calculations into units and load-balancing the units among the return calculation nodes, embodiments may get better utilization out of the available computers in the tax processing centers than conventional tax calculation solutions.

Figure 1:
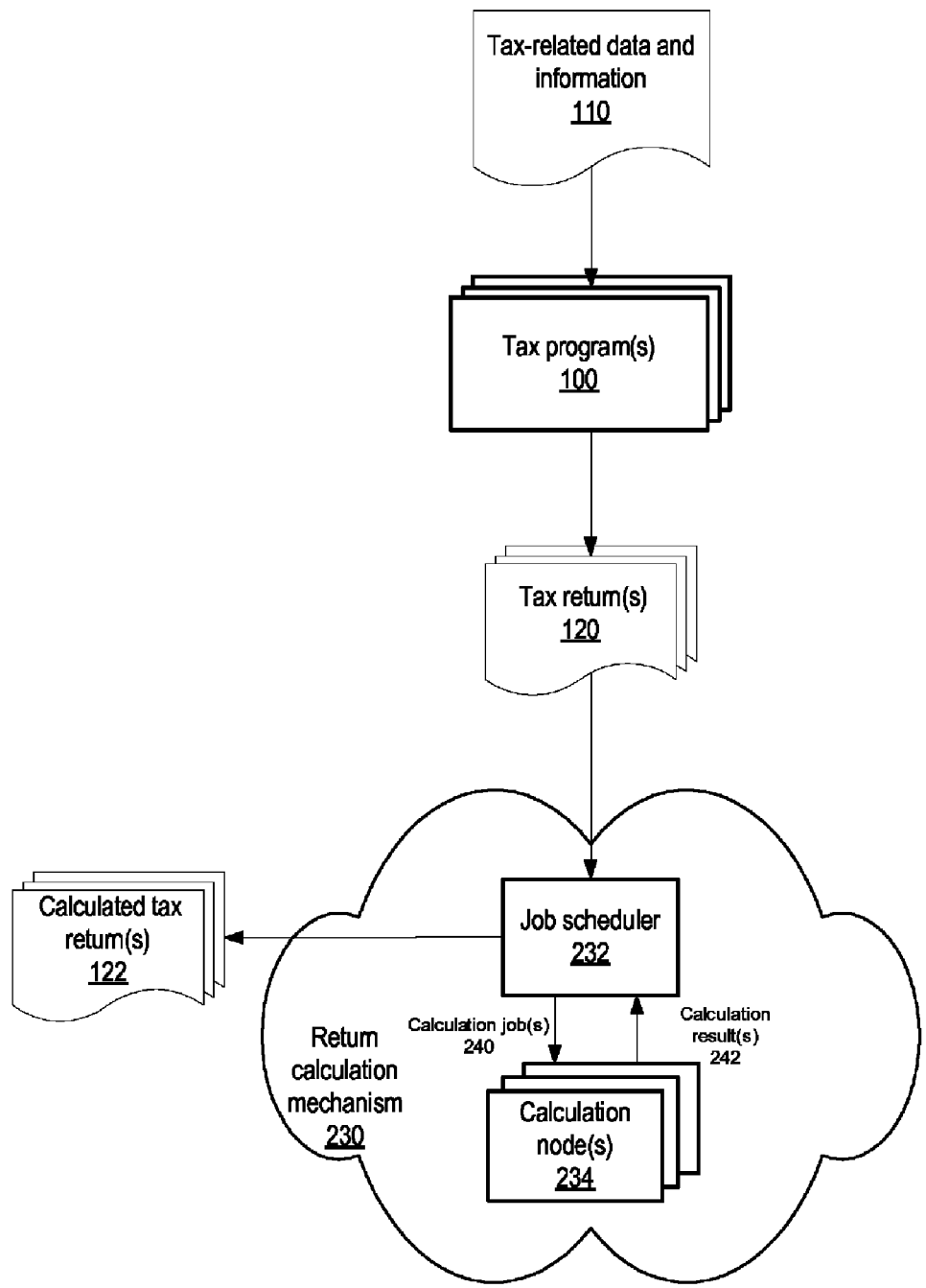
FIG. 1 illustrates the preparation of tax returns using a network-based tax program and a return calculation mechanism according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION OF EMBODIMENTS

Various embodiments of a method and apparatus for return processing are described. Although the descriptions provided herein are generally given in reference to the preparation of tax returns, the method and apparatus described herein may be applied to the preparation and filing of return-type documents by individuals, businesses, corporations, or other entities with any type of regulatory authority or agency.

In embodiments, a return calculation mechanism may be provided that distributes return calculation jobs among a plurality of return calculation nodes. A job scheduler may be provided that receives tax data and information (such as tax returns) from one or more sources and allocates and distributes the return calculation jobs among the plurality of return calculation nodes according to a load-balancing scheme. The job scheduler may decompose tax return calculations into units of work, or return calculation jobs. A return calculation job may be the calculation of an individual tax return in its entirety or a calculation of a part or portion of a tax return. For example, large, complex tax returns such as corporate consolidated tax returns may be broken into units of work or return calculation jobs. In one embodiment, results from return calculation jobs completed on the return calculation nodes may be returned to the job scheduler.

In one embodiment, the return calculation jobs that are units of a decomposed tax return calculation, such as a decomposed consolidated tax return, may be prioritized by the job scheduler according to a dependency ordering scheme. For example, a return calculation job B may depend on tax data calculated in a return calculation job A. The job scheduler may understand these dependencies, and thus may schedule return calculation job A to be executed by a return calculation node before or concurrently with return calculation job A.

In one embodiment, return calculation nodes may store a local cache of recently calculated tax data. When new return calculation jobs are scheduled that depend on other return calculation jobs, the job scheduler may assign those jobs to return calculation nodes on which the local cache contains data from the previous jobs that the new jobs depend on.

To determine dependencies, in one embodiment, the job scheduler may be configured to determine and keep track of the dependencies among submitted tax returns. In one embodiment, instead of the job scheduler determining the dependencies up-front, the job scheduler may instead allocate return calculation jobs to the return calculation nodes, and the return calculation nodes may determine the dependencies. The return calculation nodes may then notify the job scheduler of the determined dependencies so that the job scheduler can consider the dependencies when allocating return calculation jobs to the return calculation nodes. One embodiment may use both methods to determine dependencies. The job scheduler may be configured to determine at least some dependencies among submitted tax returns. The job scheduler may then allocate the return calculation jobs for the tax returns to the return calculation nodes, and the return calculation nodes may determine other dependencies among the jobs and notify the job scheduler of the determined dependencies. In any case, the job scheduler performs the load-balancing among the return calculation nodes, and the load-balancing scheme considers the determined dependencies in prioritizing and allocating the return calculation jobs among the return calculation nodes.

In one embodiment, the job scheduler may submit a return calculation job to a return calculation node to begin calculations even if the return calculation job depends on another return calculation job that has not been completed. The return calculation node may perform as many calculations as possible that do not depend on the other return calculation job, and then wait for the other return calculation job to be completed to proceed with the calculations.

The following describes an example of processing a consolidated tax return for a corporation that has several entities using an embodiment of a return calculation mechanism. In processing a consolidated tax return for a corporation that has several entities, the job scheduler may determine that a unit of work is one corporate entity. For example, a corporation may have five companies or other entities in the corporate structure. The corporate tax department may need to calculate a consolidated corporate tax return. Data and information for all of the five entities may be entered and submitted. The tax program may be directed to calculate the consolidated corporate tax return. The entered data and information for the five entities is submitted to the job scheduler. The job scheduler determines that it is to calculate a consolidated tax return. The job schedule may traverse down through the structure of the submitted tax return data and information to identify the corporate entities, and may identify a lowest-level uncalculated tax return. The job scheduler may determine how many return calculation nodes are available for processing return calculation jobs. For example, five return calculation nodes may be available. The job scheduler may allocate the calculations for each of the five corporate entities to a different one of the five return calculation nodes as separate return calculation jobs. The job scheduler may then wait for results of the return calculation jobs to be returned from the return calculation nodes. As the return calculation jobs are completed, the return calculation nodes notify the job scheduler. Dependencies, if any, may be satisfied, and, after all of the return calculation jobs for the consolidated tax return are completed, the job scheduler may then issue the final consolidation to one of the return calculation nodes as a return calculation job.

Note that, if there are dependencies among the return calculation jobs, one return calculation job may be scheduled by the job scheduler to wait for another return calculation job to be completed. The job scheduler may determine the dependencies in advance, keep track of the dependencies and the status of the return calculation jobs, may queue a return calculation job in a wait state for a dependency on another return calculation job, and release the queued return calculation job once the return calculation job it depends on has completed. In one embodiment, a return calculation node may discover one or more dependencies of a return calculation job submitted to the return calculation node on one or more other return calculation jobs, and may notify the job scheduler of those dependencies. The job scheduler may also prioritize the scheduling of the other return calculation job(s) so that the job(s) are allocated to return calculation nodes for processing as soon as possible.

Embodiments of the return calculation mechanism may address data locality. In some cases, for example when calculating the corporate tax returns of a large corporation, an extremely large amount of data may be needed by a return calculation job. Moving such large amounts of data from one return calculation node to another may take nearly as long as performing a tax calculation. In embodiments of the return calculation mechanism, if the dependencies that are needed by a return calculation job have already been calculated on a return calculation node, the data may be stored in a local cache on the node. The job scheduler may allocate the return calculation job to be performed on the tax allocation node that already has the data needed to satisfy the dependencies, and thus the data may not need to be transferred between return calculation nodes. Note that this is more of a performance issue than a load-balancing issue; a general load-balancing scheme preferentially allocates jobs to nodes that are least busy. The algorithm that may be used in embodiments of the return calculation mechanism may preferentially allocate return calculation jobs to return calculation nodes on which dependency data is stored in a local cache.

Note that the existence of dependency data stored in local caches may be considered a weighting factor to the overall job scheduling/load-balancing algorithm. A return calculation node that has dependency may also be the busiest node. In such a case, it may be better for overall performance to move the dependency data to another return calculation node that is not busy. Thus, embodiments of the return calculation mechanism may consider both data locality and workload when deciding on which return calculation nodes the return calculation jobs are to be executed.

Embodiments of the return calculation mechanism may provide load balancing, scalability and failover capabilities. The job scheduler may track the status and loads of the return calculation nodes, and allocate return calculation jobs to the return calculation nodes according to a load-balancing scheme. New computers may be added to the return calculation mechanism and recognized automatically by the job scheduler as return calculation nodes, and return calculation jobs may be allocated to the new return calculation nodes according to the load-balancing scheme. Note that the dependency ordering scheme mentioned above may be integrated in the load-balancing scheme, so that dependencies are considered when allocating jobs to the return calculation nodes. Return calculation nodes that fail to respond, for example to status and job requests from the job scheduler, for a specified period may be removed from the return calculation mechanism automatically. Any tax calculations jobs previously allocated to a failed return calculation node and not completed may be re-allocated to one or more other return calculation nodes. In one embodiment, one or more failover job schedulers may be provided, and a failover job scheduler may take over the responsibility of job scheduling if the job scheduler fails for some reason.

Embodiments of the return calculation mechanism as described herein may be implemented to support any kind of tax program, whether desktop or network-based, as a backend tax calculation solution. Embodiments of the return calculation mechanism may be implemented as back-end tax calculation solutions in data centers for desktop or network-based tax programs offered to personal, professional, and/or business users as a tax processing service over the internet and which may need to process thousands or even millions of individual tax returns. In such environments, where tax calculation is provided as a service to many users, and where the tax calculations may be performed for a wide variety of entities and a wide variety of tax returns, throughput in processing the tax returns is critical, as is availability of the tax processing service. Users expect fast turnaround times for their tax returns, and expect the service to be available when needed. In such environments, to support fault tolerance, availability, and scalability, computing devices may be added to or removed from the return calculation mechanism as needed to scale up or scale down the return calculation mechanism, to handle load, and/or to cover for machine failure. Embodiments of the return calculation mechanism as described herein automatically recognize newly added computer systems as return calculation nodes and automatically failover to other return calculation nodes to recover from the failure of a return calculation node.

Embodiments of the return calculation mechanism may also be implemented in enterprise environments, for example in the tax departments of corporations that may have many subsidiary entities, including but not limited to partially or wholly owned companies. In corporate environments, embodiments of the return calculation mechanism may, for example, be implemented as backend tax calculation solutions in enterprise tax systems installed in the corporate network environment. Tax calculations for a corporation with many subsidiary entities may take a long time, days or even weeks. Corporate tax departments may have a short window of time to get all of the corporate tax information into the system, to perform the calculations, to review the results, and to get the tax returns and other tax documents, forms, or tax information filed with the proper tax authorities. Calculation time is therefore critical, and embodiments of the return calculation mechanism as described herein may help to reduce the total tax calculation time. In addition, availability of the tax calculation system is critical; corporate users expect the system to be available when needed, and failures of the system during critical tax schedules can be catastrophic.

In corporate environments, as in network-based tax processing service environments, to support fault tolerance, availability, and scalability, computing devices may be added to or removed from the return calculation mechanism as needed to scale up or scale down the return calculation mechanism, to handle load, and/or to cover for machine failure. Embodiments of the return calculation mechanism as described herein automatically recognize newly added computer systems as return calculation nodes and automatically failover to other return calculation nodes to recover from the failure of a return calculation node.

Embodiments of the return calculation mechanism may help tax processing centers, whether those of internet-based tax processing services or corporate tax departments, to leverage the hardware the centers have available as best they can. Computers can be added to or removed from the return calculation mechanism as needed to support the tax calculation load. Further, the return calculation mechanism may partition or decompose tax returns into units of work and load-balance the units of work across return calculation nodes to best utilize the processing power of the nodes. By dividing the tax calculations into small units and load-balancing the units among the return calculation nodes, embodiments may get better utilization out of the available computers in the tax processing centers than conventional tax calculation solutions.

Figure 7:
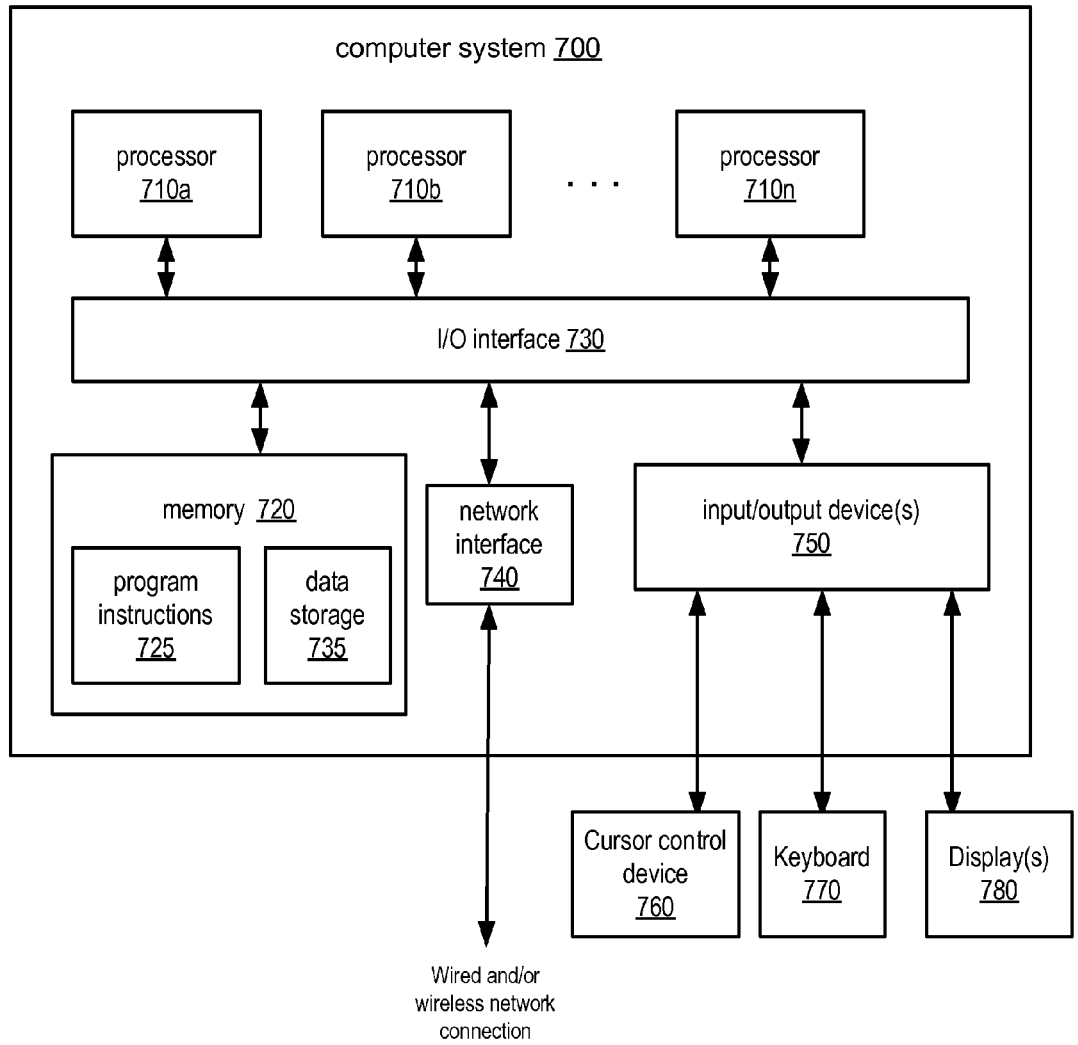
FIG. 7 illustrates an exemplary computer system on which embodiments may be implemented.

FIG. 1 illustrates the preparation of tax returns using a network-based tax program and a return calculation mechanism according to one embodiment. An instance of tax program 100 may be installed and executed on a computer system. An exemplary computer system on which an instance of tax program 100 may be implemented is illustrated in FIG. 7. Tax program 100 may be a network- or web-based tax return preparation program which preparers may access (e.g., via a web browser or other application on the preparers' local computer systems, via client systems in a corporate network or intranet, or via some other mechanism) to prepare or submit various tax forms, tax documents, or other tax-related data and information 110 via a network connection to a remote computer system (e.g., a server).

A preparer may access or execute tax program 100 to prepare one or more tax returns 120 or other tax-related documents for one or more taxable entities. A taxable entity may be the preparer, or may be another taxable entity for which the preparer is preparing a tax return or other tax-related document. Note that a taxable entity may be a person, a business, a corporation, a sub-entity of a corporation, or any other entity for which a tax return or other document is to be prepared. Further, a taxable entity may represent two persons that file joint tax returns. The tax return may be a current tax return under preparation for filing in a current tax period, a previously filed tax return being amended, or a tax return being prepared in advance for a future tax period. Further, other tax-related documents and required tax filings than tax returns may be prepared using embodiments. For the purpose of this document, tax returns 120 is intended to include any tax return, tax filing, or tax related document that may be prepared using a tax program 100 and calculated via an embodiment of the return calculation mechanism 230.

Tax program 100 may provide a user interface to guide or step the preparer in the preparation of one or more tax returns 120. Different areas for preparing various tax returns 120, for example tax returns or other tax-related documents for filing with different tax authorities, may be identified as different modules in tax program 100. A tax return under preparation may be associated with a particular module (e.g., 1040 federal returns, individual state returns, 1120 federal, corporate state returns, etc.) in the tax program 100. Thus, tax program 100 may provide a user interface that allows the preparer to select an appropriate module from among two or more modules, for example for preparing a tax return or other tax-related document for filing with a particular tax authority.

Tax program 100 may provide electronic tax documents—the various forms, schedules, worksheets, data entry displays, etc. needed to prepare and file tax returns 120 or other tax-related documents. For example, Federal tax return forms that may be provided may include, but are not limited to, 1040, 1040A, 1040EZ, 1040NR, 1040X, and 1065 forms. As another example, various tax forms and schedules for various States or other municipalities may be included. In some implementations of a network-based tax program 100, these tax documents may be graphically presented by the tax program to the tax preparer on a display device (e.g., a computer monitor or screen of a hand-held device such as a PDA). Typically, a network-based tax program 100 will provide a data entry mechanism via a user interface with various user interface elements (menus, dialog boxes, etc.) and user-selectable interface items (menu items, buttons, controls, text entry boxes, etc.) whereby the preparer may access the documents as needed and enter or modify data on the various tax documents using one or more data entry/cursor control mechanisms, such as a keyboard and mouse. These documents may be presented on the user interface as templates that, when partially or completely filled out, may be submitted to tax program 100 for calculation.

In addition, one or more of the values from previous tax return information and/or from other sources or documents may be transferred into or used in the calculation of values for the tax returns 120. Further, values from a field or fields on one or more electronic tax documents may be transferred to other electronic tax documents. For example, a calculated value from a worksheet or form may be transferred into or used in the calculation of a field on another electronic tax document.

Instead of or as an alternative to entering the necessary data and information directly to the electronic tax documents (e.g., directly to a 1040 form), some implementations of a network-based tax program 100 may provide an input mechanism whereby the tax preparer inputs necessary data and information into input fields on one or more data entry displays presented to the user by tax program 100. Note that data and/or information from other sources, which may include but is not limited to data and/or information from a previous tax return, from other data entry displays, or from other electronic tax documents related to the preparation of the tax return 120 under preparation, may be transferred into or used in the calculation of values for some fields in the data entry displays. Data and information from the data entry displays may be automatically transferred into the appropriate locations on electronic tax return documents (e.g., onto an electronic 1040 form) and/or onto other data entry displays. The tax preparer may input the necessary data and information related to a tax return 120 via the data entry displays and, once completed, may then submit the tax return to tax program 100 for calculation.

In addition to preparer-entered or transferred values, various calculations to generate values for fields in electronic tax documents or other values related to the tax returns 120 under preparation, and/or to generate other tax-related documents or even other tax returns from the data and information entered for or calculated for tax returns 120, may be required. In embodiments, return calculation mechanism 230 is configured as a back-end system to perform the tax calculations for tax program 100. Note that inputs to a particular calculation to generate a value for a tax return 120 may include one or more values from one or more sources. One or more data values entered by the preparer via the data entry user interface may be used in calculations to generate new values from some fields in electronic tax documents. In some cases, one or more values from previous tax return information may be used in calculations to generate new values for some fields. Calculated values or values from fields on electronic tax documents may be used as input into other calculations. Also note that some values used in calculations may be coded as "constants" into the tax calculation software implemented in return calculation mechanism 230, or alternatively may be read into the tax calculation software implemented by return calculation mechanism 230 from one or more stored data files as needed. In addition, values calculated in the preparation of one tax return 120 may be required as input on another tax return 120. For example, in corporate consolidated tax returns, a tax return 120 under preparation for one entity within the corporation may depend on values calculated for the tax returns of one or more other entities of the corporation. As another example, individuals and corporations may be required to file tax returns to multiple tax authorities, for example a corporation may be required to file local, state, federal, and possibly even international tax returns. The calculations of these tax returns for different tax authorities may include dependencies—the calculation of one tax return to one tax authority may require tax data from another tax return prepared for another tax authority. Return calculation mechanism 230 implements the tax calculation software including tax formulas and tax-related data, such as tax tables, to perform all such calculations for tax returns 120 submitted via tax program 100.

A tax preparer may enter the necessary data and information for a tax return 120 via the user interface of the network-based tax program 100, and, when done, access the user interface to direct the tax program 100 to complete the tax return(s) 120 under preparation. The tax program 100 may then provide the tax preparer's data and information to return calculation mechanism 230 to perform the necessary calculations using the entered data and information and in accordance with various tax formulas and tax-related data relevant to the particular tax return 120 under preparation, and possibly data and information from other sources such as previous tax returns or other tax-related documents for the taxable entity for which the tax return(s) are being prepared. Return calculation mechanism 230 may then generate the appropriate calculated values for the fields of the tax return(s) 120 under preparation, and possibly additional tax-related documents, and output the results of the calculations as calculated tax return(s) 122.

Note that in large and complex tax preparations, tax program 100 may not submit all of the data and information for a tax preparation process at one time. For example, in a corporate tax program 100, different divisions or entities may submit tax information at different times, and the submitted tax information may be provided to return calculation mechanism 230 as it is received, rather than all at once, so that the return calculation mechanism 230 may begin processing the corporate tax return before all of the data and information required to complete the tax return is submitted.

In one embodiment, return calculation mechanism 230 may include at least one job scheduler 232, which may also be referred to herein as a job scheduler node, and one or more return calculation nodes 234. An exemplary computer system on which an instance of job scheduler 232 or an instance of a return calculation node 234 may be implemented is illustrated in FIG. 7. Job scheduler 232 may receive tax data and information (such as tax returns 120) from one or more instances of tax program 100 and allocate the tax returns 120 as return calculation jobs among the return calculation nodes 234 according to a load-balancing scheme. The job scheduler 232 may decompose tax returns 120 into units of work, or return calculation jobs. A return calculation job may be the calculation of an individual tax return 120 in its entirety or a calculation of a part or portion of a tax return 120. For example, large, complex tax returns such as corporate consolidated tax returns may be broken into units of work or return calculation jobs. In one embodiment, the return calculation jobs that are units of a decomposed tax return calculation, such as a decomposed consolidated tax return, may be prioritized by the job scheduler according to a dependency-ordering scheme, which may be integrated as part of the overall load-balancing scheme. For example, a return calculation job B may depend on data values that are calculated in a return calculation job A. The job scheduler 232 may understand these dependencies, and thus may schedule return calculation job A to be executed by a return calculation node 234, such as return calculation node 234A, before or concurrently with return calculation job B by a return calculation node 234, such as return calculation node 234B.

A calculated tax return 122 for a taxable entity may, but does not necessarily, indicate that the taxable entity owes taxes to one or more tax authorities and/or that the taxable entity is owed tax refunds from one or more tax authorities. The tax return(s) 122 may then be filed with the appropriate tax authorities. Note that calculated tax return(s) 122 may include any type of local, state, federal, or even international tax return, or other tax-related document or required tax filing.

Note that tax program 100 may be a network-based tax program used by many tax preparers to prepare various tax documents and tax returns. The number of users (tax preparers) may be in the thousands or even millions. Tax program 100 may, for example, be a network- or web-based tax return preparation program provided as a service which many individual users, both individuals and business, may access (e.g., via web browsers or other applications on the users' local computer systems) to prepare various tax returns via network connections to one or more remote computer systems (e.g., servers) on which tax program 100 resides. Tax program 100 may feed tax return information entered by the users to return calculation mechanism 230 to be calculated. Alternatively, tax program 100 and return calculation mechanism 230 may be components of a corporate tax preparation system installation in a corporation's tax department for preparing the corporation's tax returns and other tax-related documents, and thus may be installed in a corporate network or intranet and accessed by corporate employees with appropriate access rights from client systems on the network to prepare the corporation's various tax returns and other tax-related documents.

Figure 2:
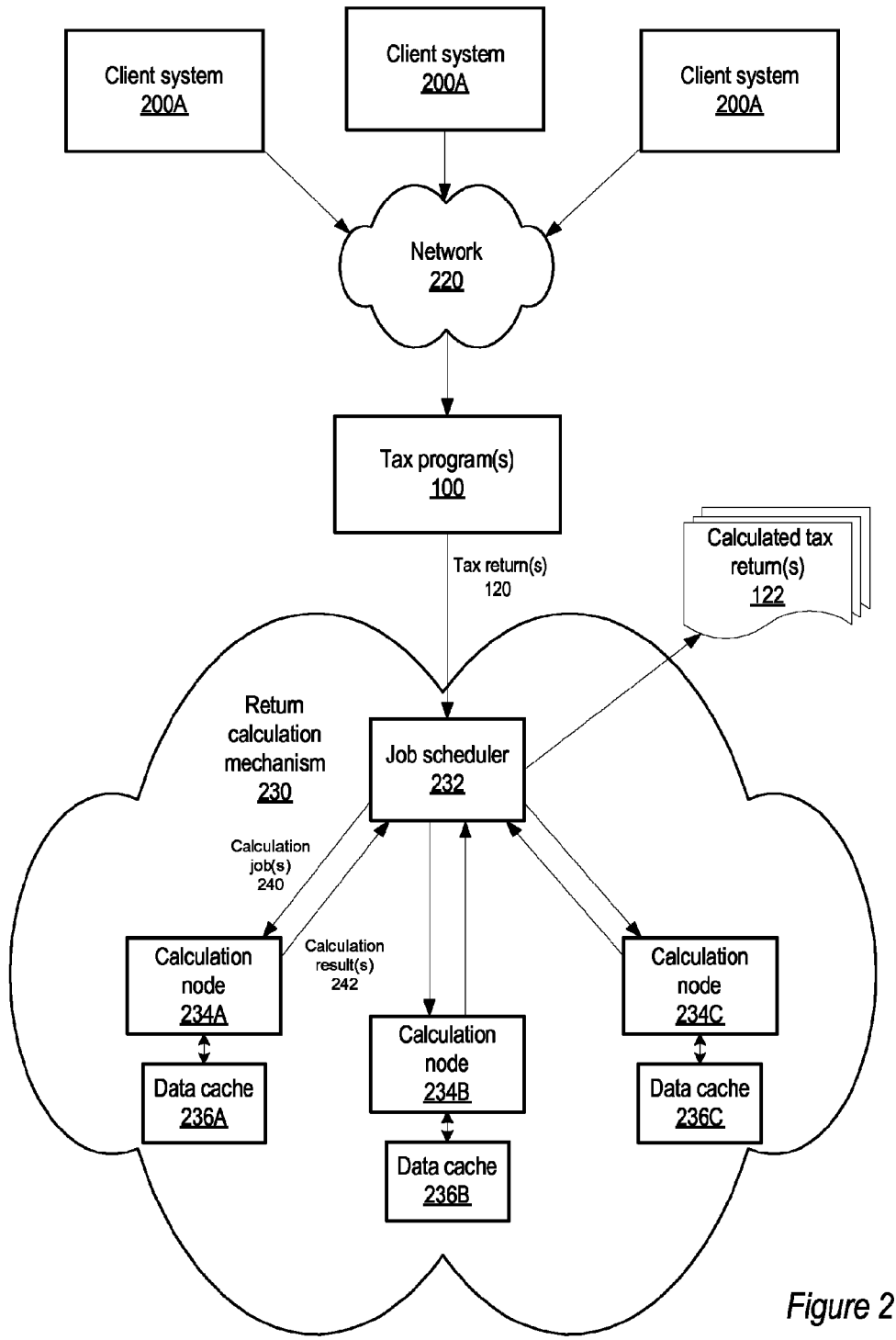
FIG. 2 illustrates a network-based tax program with a return calculation mechanism that may be used to calculate tax returns for clients according to one embodiment.

FIG. 2 illustrates a network-based tax program with a return calculation mechanism that may be used to calculate tax returns for clients according to one embodiment. Tax program 100 and return calculation mechanism 230 may be components of a network- or internet-based tax processing service that is provided to personal, professional, and/or business tax preparers. An exemplary computer system on which an instance or component(s) of tax program 100 may be implemented is illustrated in FIG. 7. Tax preparers on client systems 200 may access tax program 100 via network 220 to enter the necessary data and information for tax returns 120. When completed, the tax preparers may direct the tax program 100 to submit the tax returns 120 to the return calculation mechanism 230 for calculation. Note that tax returns 120 may be submitted for calculation by tax preparers in an essentially random fashion, and at varying rates. Tax program 100 may receive hundreds or thousands of tax returns 120 per hour that need to be calculated.

Job scheduler 232 may receive the tax returns 120 submitted via tax program 100 for calculation. An exemplary computer system on which an instance of job scheduler 232 may be implemented is illustrated in FIG. 7. Note that tax returns 120 may be received individually or in batches, the rate at which job scheduler 232 receives the returns 120 may vary, and job scheduler 232 may receive hundreds or thousands of tax returns 120 per hour that need to be calculated.

Return calculation mechanism 230 may include two or more return calculation nodes 234. An exemplary computer system on which an instance of a return calculation node 234 may be implemented is illustrated in FIG. 7. Job scheduler 232 may allocate the received tax returns 120 among the return calculation nodes 234 as return calculation jobs 240 in accordance with a load-balancing scheme implemented by job scheduler 232. Each return calculation job 240 represents a unit of work. Note that an individual tax return 120 may be submitted as one return calculation job 240 to one return calculation node 234. In some cases, a tax return 120 may be decomposed into two or more units of work by job scheduler 232, and the units of work may be allocated among the return calculation nodes 234 as separate return calculation jobs 240. If there are dependencies among the return calculation jobs 240 that result from such a decomposition, the dependencies may be taken into account by return calculation mechanism 230 when allocating the return calculation jobs 240 among the return calculation nodes 234 according to the load-balancing scheme. For example, a return calculation job 240 that depends on results of calculations of another return calculation job 240 may be held by job scheduler 232 for submission to a return calculation node 234 after the other return calculation job 240 is completed. When all of the return calculation jobs 240 for a decomposed tax return 120 have been calculated, the results 242 may be submitted to a return calculation node 232 for consolidation.

In one embodiment, each return calculation node 234 may maintain a local cache 236 of recently calculated data. If one return calculation job 240 depends on the calculations of another return calculation job 240, the load-balancing scheme implemented by job scheduler 232 may be configured to weight the scheduling of the return calculation job 240 towards allocating the return calculation job 240 to the return calculation node 234 on which the other return calculation job 240 is calculated so that the data from the other return calculation job 240 is locally available and does not have to be transferred to another return calculation node 234.

Return calculation jobs 240 completed by the return calculation nodes 234 are returned to the job scheduler 232 as calculation results 240. Note that, if one return calculation job 240 submitted to one return calculation node 234 depends on results of another return calculation job 240 submitted to another return calculation node 234, data may be transferred via a network from the other return calculation node 234 to the return calculation node 234 on which the dependent return calculation job 240 is to be calculated. Once all of the return calculation job(s) 240 for a tax return 120 are completed, the calculation results 240 may be merged, if necessary, or otherwise processed to output calculated tax return(s) 122. In one embodiment, calculated tax return(s) 122 may be returned to tax program 100 for any necessary completion or verification and for dispersal to the appropriate tax preparers or taxable entities and possibly for forwarding to the appropriate tax authorities.

Figure 3:
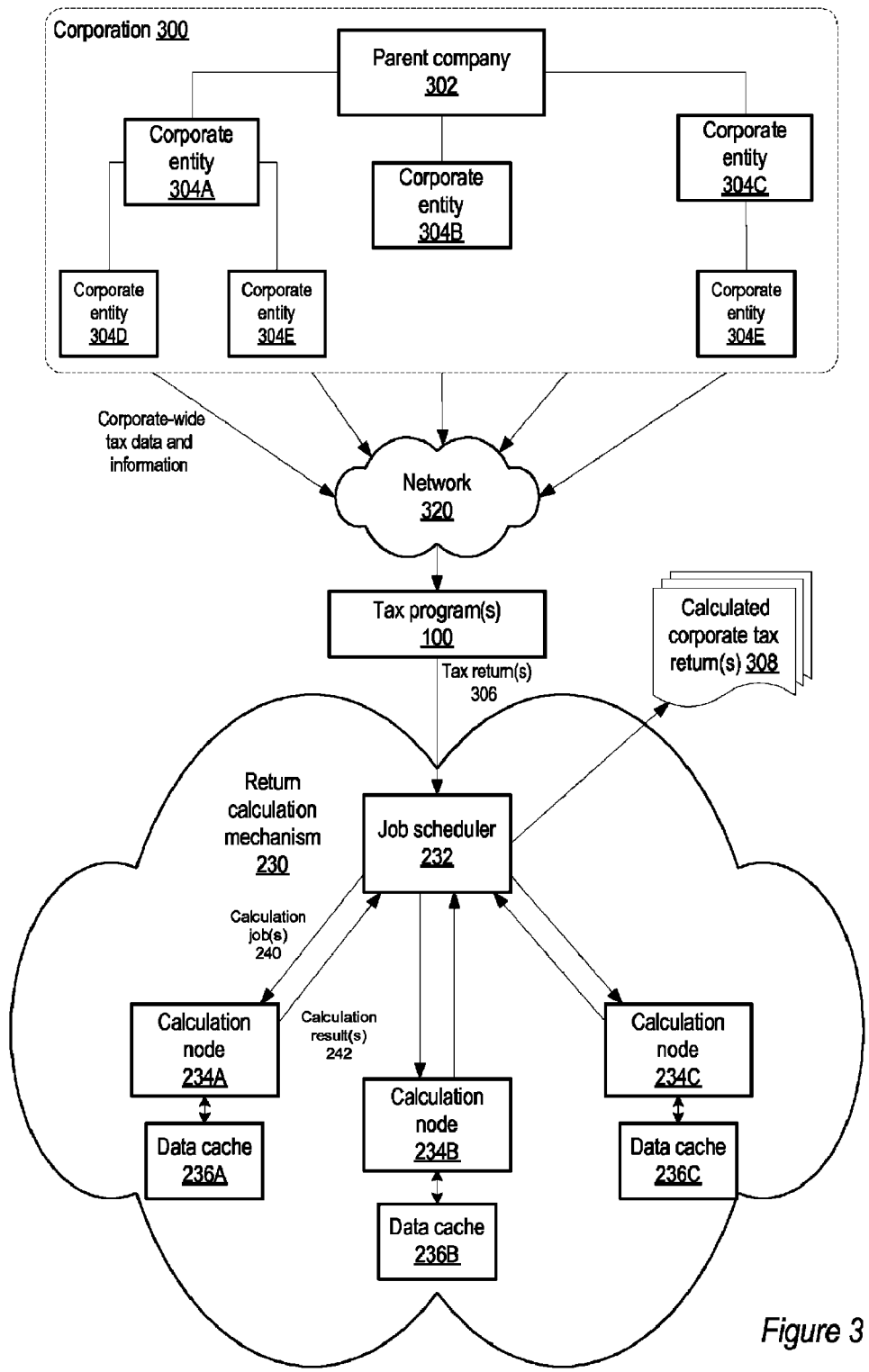
FIG. 3 illustrates a return calculation mechanism in a corporate network environment, according to one embodiment.

FIG. 3 illustrates a return calculation mechanism in a corporate network environment, according to one embodiment. Corporation 300 may include a parent company 302 and one or more subsidiary corporate entities 304. Note that one or more of the corporate entities 304 may have subsidiary corporate entities 304, and thus the corporation 300 may be viewed as a hierarchy of entities, with the parent company 302 at the top of the hierarchy. Corporation 300 may be required to file tax returns 306 or other tax documents or forms with one or more tax authorities. The parent company 302 may be required to file corporate-level tax return(s) 306, and each corporate entity 304 may be required to file separate tax return(s) 306. The corporate-level tax return(s) 306 may require the input of data calculated for the tax returns 306 of the individual corporate entities 304. In addition, the tax return 306 of one corporate entity 304 may require the input of data calculated for the tax returns 306 of one or more subsidiary corporate entities 304 or even the input of data calculated for the tax returns 306 of other corporate entities 304 in the corporation 300 that are not subsidiaries. In addition, the corporation 300 may be required to prepare tax returns, tax documents or forms for partners, shareholders, officers, or other individuals or companies that own portions of or are otherwise involved in or receive income from or have investments in corporation 300.

Tax program 100 and return calculation mechanism 230 may, for example, be components of a network-based enterprise tax processing system implemented in a corporate network or intranet of corporation 300 (network 320). An exemplary computer system on which an instance or component(s) of tax program 100 may be implemented is illustrated in FIG. 7. In one embodiment, tax program 100 may serve as the "front end" of the enterprise tax system, and return calculation mechanism 230 the "back end". Employees of various entities of the corporation may access tax program 100 via client systems on the corporate network 320 to enter the necessary data and information for corporate tax returns 306, including but not limited to data and information for tax returns for the individual corporate entities 304 of the corporation 300 and data and information for the corporate-level tax returns. When the data and information (tax returns 306) is ready, the tax program 100 may be directed to begin the calculations for the tax returns 306. The data and information may then be submitted to the return calculation mechanism 230 by tax program 100 for calculation. Note that data and information may be submitted to return calculation mechanism 230 by tax program 100 for calculation before all of the data and information for the corporation has been entered. For example, the data and information for corporate entity 304B may be ready before the data and information for corporate entity 304C, and the tax return 306 for corporate entity 304B may thus be submitted to return calculation mechanism 230 and calculations begun before entry of the data and information for corporate entity 304C is completed.

Job scheduler 232 may receive the tax returns 306 submitted via tax program 100 for calculation. An exemplary computer system on which an instance of job scheduler 232 may be implemented is illustrated in FIG. 7. Note that tax returns 306 may be received by job scheduler 232 individually or in batches, or even all at once.

Return calculation mechanism 230 may include two or more return calculation nodes 234. An exemplary computer system on which an instance of a return calculation node 234 may be implemented is illustrated in FIG. 7. Job scheduler 232 may allocate the received tax returns 306 among the return calculation nodes 234 as return calculation jobs 240 in accordance with a load-balancing scheme implemented by job scheduler 232. Each return calculation job 240 represents a unit of work. Note that an individual tax return 306 may be submitted as one return calculation job 240 to one return calculation node 234. In at least some cases, a tax return 306 may be decomposed into two or more units of work by job scheduler 232, and the units of work may be allocated among the return calculation nodes 234 as separate return calculation jobs 240. If there are dependencies among the return calculation jobs 240 that result from such a decomposition, or if there are dependencies between two or more of the individual tax returns 306, the dependencies may be taken into account by return calculation mechanism 230 when allocating the return calculation jobs 240 among the return calculation nodes 234 according to the load-balancing scheme. For example, a return calculation job 240 that depends on results of calculations of another return calculation job 240 may be held by job scheduler 232 for submission to a return calculation node 234 after the other return calculation job 240 is completed.

In one embodiment, each return calculation node 234 may maintain a local cache 236 of recently calculated data. If one return calculation job 240 depends on the calculations of another return calculation job 240, the load-balancing scheme implemented by job scheduler 232 may be configured to weight the scheduling of the return calculation job 240 towards allocating the return calculation job 240 to the return calculation node 234 on which the other return calculation job 240 is calculated so that the data from the other return calculation job 240 is locally available and does not have to be transferred to another return calculation node 234.

Return calculation jobs 240 completed by the return calculation nodes 234 are returned to the job scheduler 232 as calculation results 240. Note that, if one return calculation job 240 submitted to one return calculation node 234 depends on results of another return calculation job 240 submitted to another return calculation node 234, data may be transferred via the network from the other return calculation node 234 to the return calculation node 234 on which the dependent return calculation job 240 is to be calculated. Once all of the return calculation job(s) 240 for a consolidated tax return are completed, the calculation results 240 may be merged, if necessary, or otherwise processed to output calculated tax return(s) 308. In one embodiment, when all of the return calculation jobs 240 for a corporate tax return have been calculated, the results 242 may be submitted to a return calculation node 232 for consolidation to generate the corporate-level tax returns.

In one embodiment, calculated tax return(s) 308 may be returned to tax program 100 for any necessary verification, or other processing, and for eventual distribution to the appropriate tax authorities or other entities. Note that calculated corporate tax returns 308 may include tax returns or other tax documents and forms for the corporate entities 304 in the corporation 300 as well as consolidated, corporate-level tax return(s) or other tax documents and forms that incorporate data and information from the tax returns of the corporate entities. In addition, the calculated corporate tax returns 308 may include tax returns, tax documents or forms for partners, shareholders, officers, or other individuals or companies that own portions of or are otherwise involved in or receive income from or have investments in corporation 300.

As mentioned, a corporation may be viewed as a hierarchy of corporate entities 304. The top of the hierarchy is parent company 302. Each corporate entity 304 beneath parent company 302 may have additional corporate entities 304 beneath it, and so on. The depth of the relationship is arbitrary. Consolidated tax returns for corporations may have significant dependencies among the hierarchy of lower-level returns for corporate entities 304. A change in a lower-level return in the hierarchy may require the entire consolidated tax return to be recalculated. Depending on where a change is made in tax returns 306, for example if a change is made in the tax return 306 information of a corporate entity 304 at a leaf node of the hierarchy, the change may ripple up multiple levels of the hierarchy, forcing recalculations at higher levels of the hierarchy all the way back to parent company 302.

Note that, for some types of corporations, the tax returns 306 for lower-level corporate entities may not be filed, but may still need to be calculated for various reasons. In some cases, the only tax returns 308 actually filed as the result of the calculations are tax returns at the corporate level. However, if a change is made at a lower level of the hierarchy of tax returns, the only way tax authorities receive the correct corporate-level tax returns is to recalculate the affected portion of the hierarchy of tax returns. For other types of corporations, such as holding companies, the tax returns 308 for lower-level corporate entities may be calculated and filed, but there are dependencies up to the corporate level tax returns that are also calculated and filed, and thus changes at the lower levels may require recalculation.

Embodiments of return calculation mechanism 230 may reduce the time required to calculate the complex, interdependent tax returns 306 of corporations. If recalculation is required for some reason, embodiments of return calculation mechanism 230 may reduce the time needed to perform the recalculation when compared to conventional corporate tax preparation systems. Further, by decomposing tax returns 306 into units of work, and allocating those units of work among the return calculation nodes 234, return calculation mechanism 230 may reduce the number of recalculations needed if a change is made, as the recalculation may be performed at the level of the units of work, and some units of work in a tax return 306 that were previously calculated may not have to be recalculated if not affected by the change and if the data is stored in the local cache of one or more of the return calculation nodes 234. In conventional corporate tax preparation systems, an entire return 306 would have to be recalculated if one change was made anywhere in the return 306.

The following describes some examples of decomposing tax returns into units of work, and processing those units of work in a return calculation mechanism according to one embodiment. Note that the examples are not intended to be limiting In one embodiment, the calculation logic may be broken down into a parse tree. A tax return may be broken into units of work according to the parse tree. In particular, complex branches of the parse tree may be designated as units of work, and return calculation jobs to perform the branches may be allocated among the return calculation nodes. In addition, different phases of the calculation may be determined to be inherently dependent, and thus some phases of the calculation may have to come before or after other phases, and thus the phases may each be designated as a unit of work, and return calculation jobs may then be scheduled by the job scheduler, taking into consideration the dependencies. For example, there are adjustments that may need to be made to a significant chart of accounts for a corporation. It may be necessary to consolidate the chart of accounts for the corporation. A calculation may be needed to apply eliminations to the chart of accounts. In such calculations, there may be transactions between owned companies that are all part of the company that are not conventional income or expense, and there may be multiple phases of the calculation that are dependent.

Another example of decomposing tax returns into units of work is in a 1065 partnership. In a 1065 partnership, there may be many partners, and it may be necessary to calculate a K1 returns for each partner. One return may be calculated for the 1065 partnership, but within that one return, the return calculation mechanism has to prepare K1 return for each partner to allocate back out any earnings or loss that goes back out to go onto their individual 1040 returns. Thus, the calculation of each K1 return may be scheduled and performed as a separate return calculation job. One or more other return calculation jobs may also be scheduled and performed to calculate the return for the 1065 partnership. Note that the 1065 partnership return may be calculated before the K1 returns are calculated, as the K1 returns may depend on the data generated in the 1065 partnership return calculations.

The 1065 example may be used to illustrate a case of data locality. The 1065 partnership return may be calculated by the return calculation mechanism. Once calculated, the generated data does not change. From there, the return calculation mechanism may proceed to calculate the K1 returns for the partners. If, for example, there are 1000 partners for which K1 returns are to be calculated, and five return calculation nodes on which to perform the calculations, 200 return calculation jobs may be scheduled to calculate K1s on each of the five return calculation nodes. Each one of the K1 return calculation jobs needs access to the 1065 data. Therefore, the 1065 data may be duplicated on each of the return calculation nodes so that each return calculation node has the necessary 1065 data stored locally to calculate the K1 returns for the partners. This illustrates that calculated data that is needed to satisfy dependencies in multiple return calculation jobs may be duplicated on one or more return calculation nodes to speed the performance of local calculations.

Another example of decomposing tax returns into units of work, and dependencies that may result therein, is the preparation of an income and dividend distribution based on ownership and dependencies when preparing international taxes. In such cases, the relationship between two entities may be circular in nature, which creates a complex calculation problem. This has similar characteristics to a consolidated corporation as previously described, with the added complexity of circular dependencies between two entities, because an entity may hold partial ownership in the other, and vice versa. The return calculation mechanism may need to calculate the dividends and distribute them appropriately before at least some of the other calculations required for the international taxes can be performed.

Figure 4A:
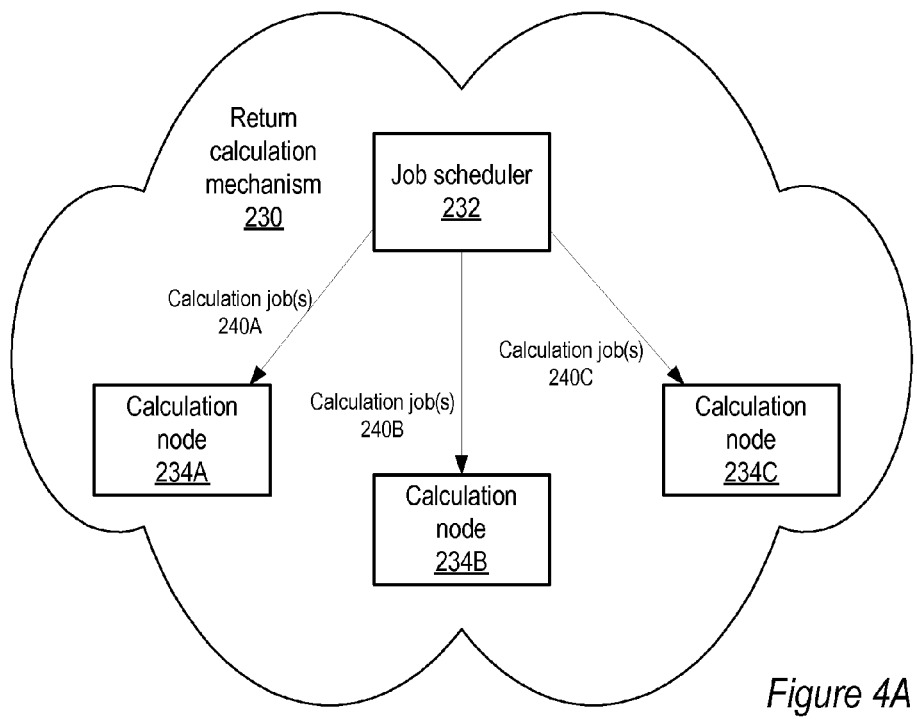
FIGS. 4A through 4C illustrate the scalability and failover capabilities of return calculation nodes in a return calculation mechanism according to one embodiment.
Figure 4B:
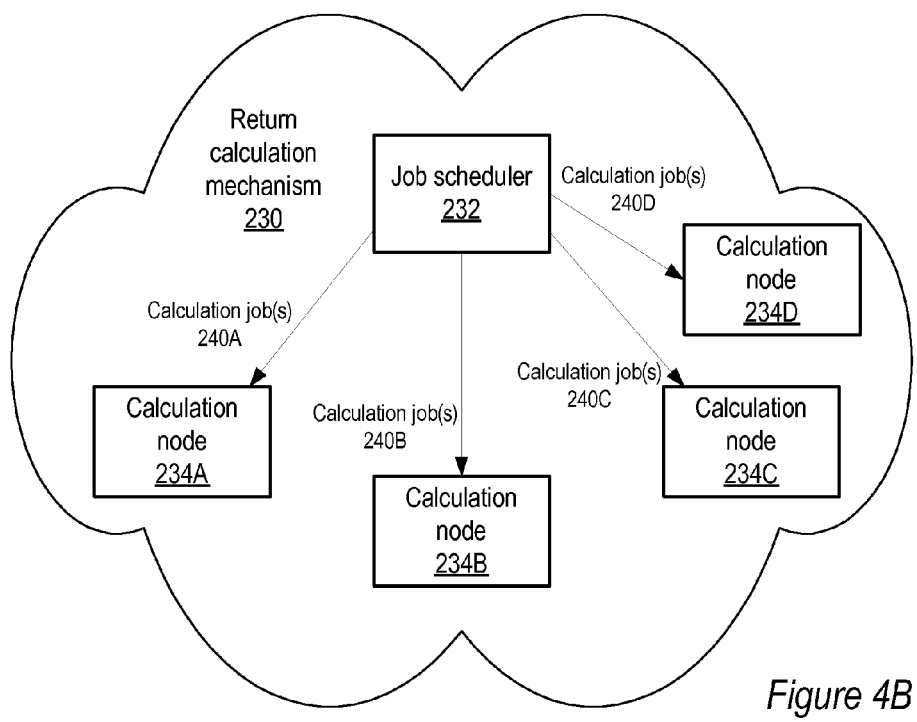
Figure 4C:
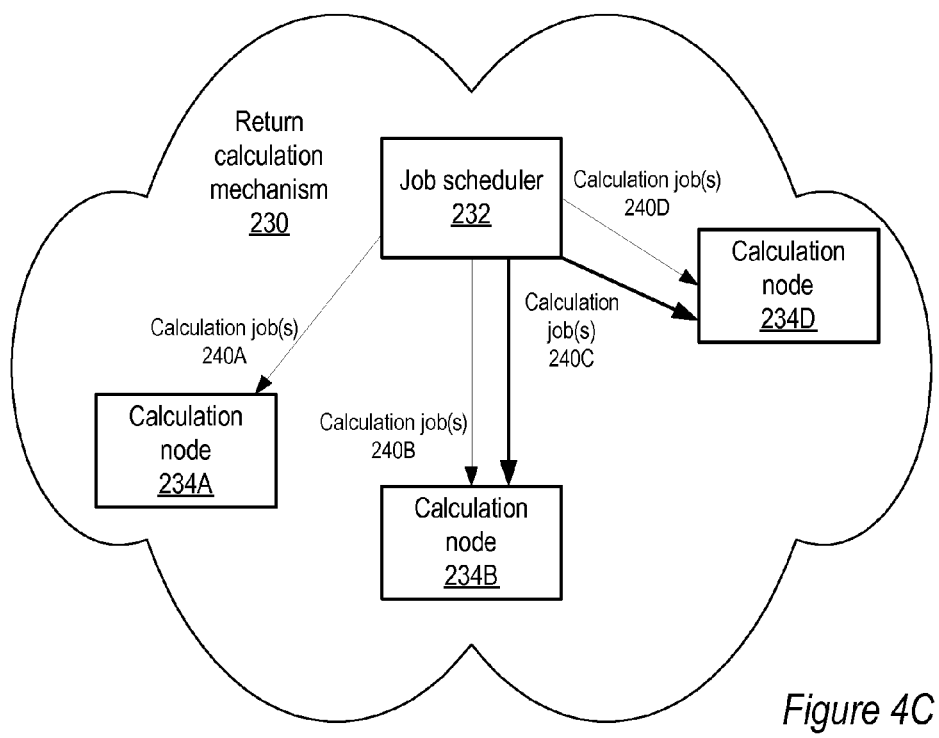

FIGS. 4A through 4C illustrate the scalability and failover capabilities of return calculation nodes in a return calculation mechanism according to one embodiment. FIG. 4A shows a return calculation mechanism 230, similar to return calculation mechanism 230 illustrated in FIGS. 1 through 3. Job scheduler 232 may receive tax returns submitted via a tax program for calculation. An exemplary computer system on which an instance of job scheduler 232 may be implemented is illustrated in FIG. 7. Return calculation mechanism 230 may include two or more return calculation nodes 234. An exemplary computer system on which an instance of a return calculation node 234 may be implemented is illustrated in FIG. 7. Job scheduler 232 may allocate the received tax returns among the return calculation nodes 234 as return calculation jobs 240 in accordance with a load-balancing scheme implemented by job scheduler 232. Each return calculation job 240 represents a unit of work. Note that an individual tax return may be submitted as one return calculation job 240 to one return calculation node 234. In at least some cases, a tax return may be decomposed into two or more units of work by job scheduler 232, and the units of work may be allocated among the return calculation nodes 234 as separate return calculation jobs 240. If there are dependencies among the return calculation jobs 240 that result from such a decomposition, the dependencies may be taken into account by return calculation mechanism 230 when allocating the return calculation jobs 240 among the return calculation nodes 234 according to the load-balancing scheme. For example, a return calculation job 240 that depends on results of calculations of another return calculation job 240 may be held by job scheduler 232 for submission to a return calculation node 234 after the other return calculation job 240 is completed.

In one embodiment, each return calculation node 234 may maintain a local cache of recently calculated data. If one return calculation job 240 depends on the calculations of another return calculation job 240, the load-balancing scheme implemented by job scheduler 232 may be configured to weight the scheduling of the return calculation job 240 towards allocating the return calculation job 240 to the return calculation node 234 on which the other return calculation job 240 is calculated so that the data from the other return calculation job 240 is locally available and does not have to be transferred to another return calculation node 234.

FIG. 4A shows three return calculation nodes 234 in return calculation mechanism 230: nodes 234A, 234B, and 234C. In FIG. 4B, an additional return calculation node 234D has been added to return calculation mechanism 230. Job scheduler may automatically recognize return calculation node 234D and begin to send return calculation job(s) 240D to return calculation node 234D in accordance with the load-balancing scheme.

In FIG. 4C, return calculation node 234C of FIG. 4B has failed, has been removed from the network, or has become unavailable for some reason. In one embodiment, return calculation nodes 234 that fail to respond, for example to status and job requests from the job scheduler 232, for a specified period may be removed from the return calculation mechanism 230 automatically. Any tax calculations jobs 240 previously allocated to a failed return calculation node 234 and not completed may be re-allocated to one or more other return calculation nodes 234. In this example, return calculation node 234C has been removed from return calculation mechanism 230 after not responding to job scheduler 232 for a specified period. Job scheduler 232 has re-allocated return calculation jobs 240C that were previously allocated to return calculation node 234C but not completed before return calculation node 234C was removed to return calculation node 234B and return calculation node 234D.

Figure 5:
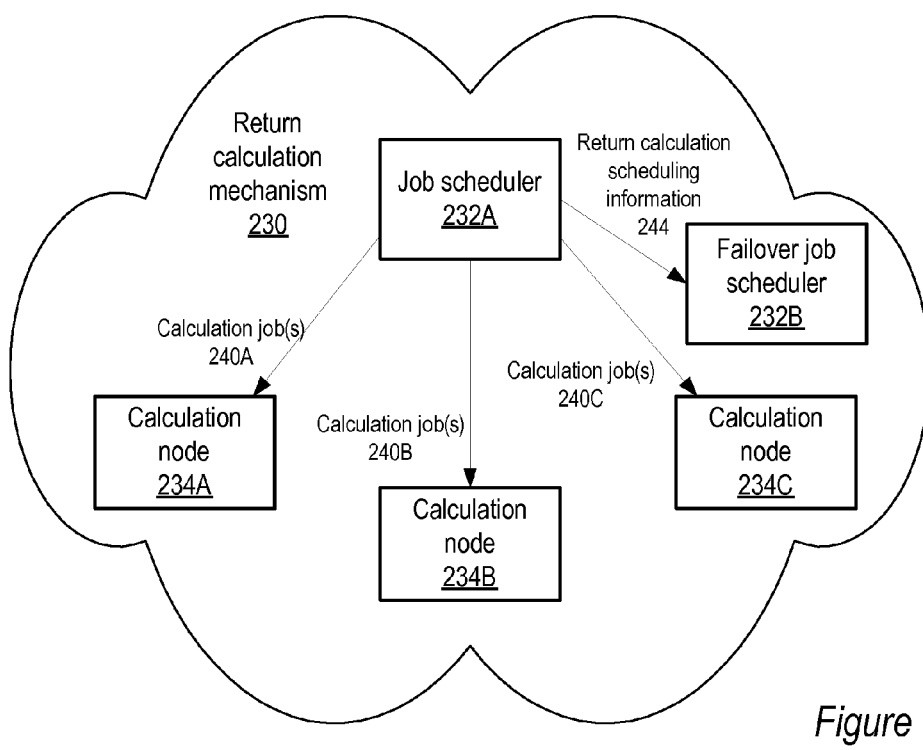
FIG. 5 illustrates a failover job scheduler in a return calculation mechanism according to one embodiment.

FIG. 5 illustrates a failover job scheduler in a return calculation mechanism according to one embodiment. FIG. 5 shows a return calculation mechanism 230, such as return calculation mechanism illustrated in FIGS. 1 through 3. Job scheduler 232A may receive tax returns submitted via a tax program for calculation. An exemplary computer system on which an instance of job scheduler 232 may be implemented is illustrated in FIG. 7. Return calculation mechanism 230 may include two or more return calculation nodes 234. An exemplary computer system on which an instance of a return calculation node 234 may be implemented is illustrated in FIG. 7. Return calculation mechanism 230 may also include a failover job scheduler 232B. Return calculation scheduling information 244 from job scheduler 232A, which may include, but is not limited to, information on available return calculation nodes 234 and the allocation of return calculation jobs 240 to the nodes 234, may be concurrently maintained on failover job scheduler 232B, or alternatively may be maintained in a separate store accessible to both job schedulers 234. If job scheduler 234A should go down for any reason, failover job scheduler 232B may be configured to automatically assume the role of job scheduling for return calculation mechanism 230.

Figure 6:
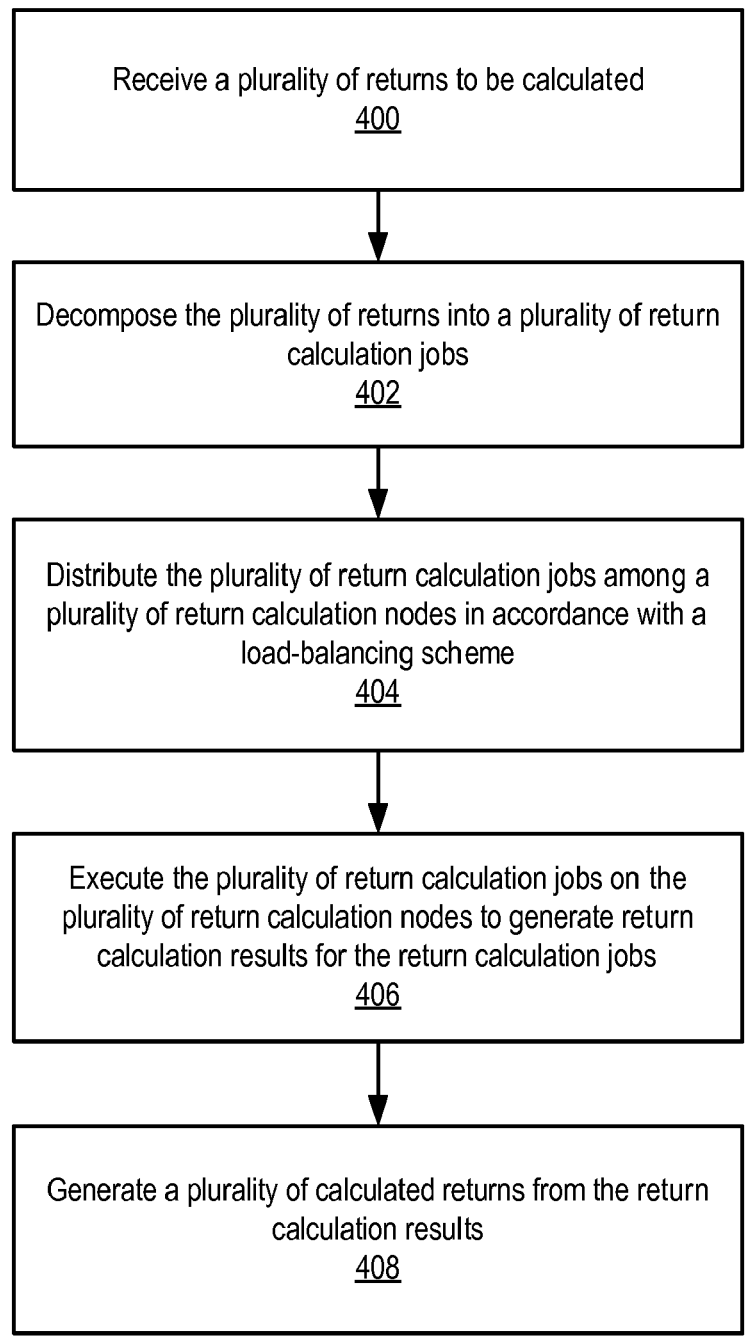
FIG. 6 is a flowchart of a method for tax calculations in network-based tax programs according to one embodiment.

FIG. 6 is a flowchart of a method for tax calculations in network-based tax programs using a return calculation mechanism according to one embodiment. As indicated at 400, a job scheduler of the return calculation mechanism may receive a plurality of tax returns to be calculated. The tax returns may be received, for example, from a tax program such as one of tax programs 100 illustrated in FIGS. 1 through 3.

As indicated at 402, the job scheduler may decompose the plurality of tax returns into a plurality of return calculation jobs. In one embodiment, in decomposing the plurality of tax returns into a plurality of return calculation jobs, each of the plurality of tax returns may be designated as a separate return calculation job. In one embodiment, in decomposing the plurality of tax returns into a plurality of return calculation jobs, one or more of the plurality of tax returns may be decomposed into two or more units of work, and each unit of work may be designated as a separate return calculation job.

In one embodiment, the return calculation mechanism may determine that the calculation of one return calculation job depends on the calculation results of another return calculation job. The job scheduler may be configured to distribute the return calculation job to a return calculation node for execution after the other return calculation job on which the return calculation job depends is distributed to a return calculation node for execution. In one embodiment, the job scheduler may be configured to schedule the return calculation job to be distributed to a return calculation node for execution after execution of the other return calculation job on which the return calculation job depends is completed. In one embodiment, the load-balancing scheme of the job scheduler may be configured to distribute, or attempt to distribute, the return calculation job to the same return calculation node on which the other tax calculation on which the return calculation job depends is executed. In one embodiment, each return calculation node may store a local cache of calculation results, and distributing a return calculation job to the same node on which another return calculation job on which the return calculation job depends may allow the return calculation job to access the dependency data it needs locally and thus without having to transfer the data from one node to another across the network. Note that, in one embodiment, a preference for distributing a return calculation job to the same node on which another return calculation job on which the tax calculation depends is executed may be considered as a weighting factor in the overall load-balancing scheme.

As indicated at 404, the job scheduler may distribute the plurality of return calculation jobs among a plurality of return calculation nodes of the return calculation mechanism in accordance with a load-balancing scheme. Note that each of the plurality of return calculation node receives one or more of the plurality of return calculation jobs for execution, and each of the plurality of return calculation jobs is distributed to exactly one of the plurality of return calculation nodes.

As indicated at 406, the plurality of return calculation nodes may execute the plurality of return calculation jobs on to generate calculation results for the return calculation jobs. As indicated at 408, a plurality of calculated tax returns may be generated from the calculation results. In some cases, for example to complete a tax return that was decomposed into two or more units of work, two or more calculation results may be returned to one of the return calculation nodes for consolidation.

Exemplary System

Various components of embodiments of a return calculation mechanism as described herein may be executed on one or more computer systems, which may interact with various other devices. One such computer system is illustrated by FIG. 7. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for the return calculation mechanism, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, configured to implement at least a portion of embodiments of the return calculation mechanism as described herein, and data storage 735, comprising various documents, tables, databases, etc. accessible by program instructions 725. In one embodiment, program instructions 725 may include software elements of the return calculation mechanism illustrated in the Figures, and data storage 735 may include data used in embodiments of the return calculation mechanism. In other embodiments, different software elements and data may be included.

Those skilled in the art will appreciate that computer system 700 is merely illustrative and is not intended to limit the scope of the return calculation mechanism as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
receiving a plurality of tax returns to be calculated for a corporation having a hierarchy of corporate entities and to be filed with a plurality of tax authorities;
decomposing, using a processor of a computer system, the plurality of tax returns into a plurality of return calculation jobs based on the plurality of tax authorities and the hierarchy of corporate entities;
distributing, by a job scheduler executing on the processor, the plurality of return calculation jobs among a plurality of return calculation nodes on a network in the computer system,
wherein a return calculation node of the plurality of return calculation nodes receives a return calculation job of the plurality of return calculation jobs for execution,
wherein the return calculation node identifies one or more dependencies by determining that execution of the return calculation job depends on calculation results of one or more other return calculation jobs of the plurality of return calculation jobs, the one or more other return calculation jobs being associated with at least one selected from a group consisting of a corporate entity in the hierarchy of corporate entities and a tax authority of the plurality of tax authorities,
wherein the return calculation node notifies the job scheduler of the one or more dependencies, and
wherein the job scheduler schedules the one or more other return calculation jobs to be allocated for processing in response to the return calculation node notifying the job scheduler;
executing the plurality of return calculation jobs on the plurality of return calculation nodes to generate the calculation results for the plurality of return calculation jobs; and
generating a plurality of calculated tax returns using at least a portion of the calculation results.

2. The method as recited in claim 1, wherein said decomposing the plurality of tax returns into the plurality of return calculation jobs comprises designating at least one of the plurality of tax returns as a separate return calculation job.

3. The method as recited in claim 1, wherein said decomposing the plurality of tax returns into the plurality of return calculation jobs comprises:
decomposing one or more of the plurality of tax returns into two or more units of work; and
designating each unit of work as a separate return calculation job.

4. The method as recited in claim 1, wherein said distributing the plurality of return calculation jobs among the plurality of return calculation nodes comprises distributing the one or more other return calculation jobs to the return calculation node for execution in response to the return calculation node notifying the job scheduler.

5. The method as recited in claim 4, further comprising:
executing the one or more other return calculation jobs on the return calculation node to generate the calculation results;
caching the calculation results in a local cache of the return calculation node; and
executing the return calculation job on the return calculation node comprising accessing the calculation results from the local cache of the return calculation node.

6. The method as recited in claim 1, further comprising:
detecting a new return calculation node on the network; and
adding the new return calculation node to the plurality of return calculation nodes.

7. The method as recited in claim 6, further comprising distributing one or more return calculation jobs to the new return calculation node in accordance with the load-balancing scheme.

8. The method as recited in claim 1, further comprising:
detecting that one of the plurality of return calculation nodes is an unavailable return calculation node that is not available to execute return calculation jobs; and redistributing one or more return calculation jobs previously distributed to the unavailable return calculation node among one or more others of the plurality of return calculation nodes.

9. The method as recited in claim 8, further comprising removing the unavailable return calculation node from the plurality of return calculation nodes so that additional return calculation jobs are not distributed to the unavailable return calculation node.

10. The method as recited in claim 1, wherein said receiving, said decomposing, and said distributing are performed by a job scheduler node on the network, wherein the job schedule node comprises the processor executing the job scheduler.

11. The method as recited in claim 10, further comprising:
maintaining a failover job scheduler node on the network; and
detecting that the job scheduler node is unavailable; and
switching to executing the job scheduler on the failover job scheduler node, wherein the failover job scheduler node performs said receiving, said decomposing, and said distributing.

12. The method as recited in claim 10, wherein the job scheduler node and the plurality of return calculation nodes are components of a return calculation mechanism, wherein the return calculation mechanism is a backend tax return processing mechanism for a network-based tax program that provides a frontend user interface for submission of the tax returns by entities, wherein the entities include one or more of individuals and businesses.

13. The method as recited in claim 10, wherein the job scheduler node and the plurality of return calculation nodes are components of a return calculation mechanism, wherein the return calculation mechanism is a backend tax return processing mechanism for a network-based corporate tax program that provides a frontend user interface for submission of the tax returns by the corporate entities.

14. A system, comprising:
a job scheduler node; and
a plurality of return calculation nodes coupled to the job scheduler node via a network;
wherein the job scheduler node comprises a processor and memory storing instructions, the instruction, when executed by the processor, comprising functionality to:
receive a plurality of returns to be calculated for a corporation having a hierarchy of corporate entities and to be filed with a plurality of tax authorities;
decompose the plurality of returns into a plurality of return calculation jobs based on the plurality of tax authorities and the hierarchy of corporate entities; and
distribute the plurality of return calculation jobs among the plurality of return calculation nodes; and
schedule one or more other return calculation jobs to be allocated for processing in response to a return calculation node of the plurality of return calculation nodes notifying the job scheduler node of one or more dependencies,
wherein the plurality of return calculation nodes are configured to:
execute the plurality of return calculation jobs to generate calculation results for the return calculation jobs; and
generate a plurality of calculated tax returns using at least a portion of the calculation results, and
wherein the return calculation node of the plurality of return calculation nodes is configured to:
receive a return calculation job of the plurality of return calculation jobs for execution;

identify the one or more dependencies by determining that execution of the return calculation job depends on said calculation results of the one or more other return calculation jobs of the plurality of return calculation jobs, the one or more other return calculation jobs being associated with at least one selected from a group consisting of a corporate entity in the hierarchy of corporate entities and a tax authority of the plurality of tax authorities; and
notify the job scheduler node of the one or more dependencies.

15. The system as recited in claim 14, wherein, to decompose the plurality of returns into a plurality of return calculation jobs, the job scheduler node is configured to designate at least one of the plurality of returns as a separate return calculation job.

16. The system as recited in claim 14, wherein, to decompose the plurality of returns into a plurality of return calculation jobs, the job scheduler node is configured to:
decompose one or more of the plurality of returns into two or more units of work; and
designate each unit of work as a separate return calculation job.

17. The system as recited in claim 14, wherein, to distribute the plurality of return calculation jobs among the plurality of return calculation nodes, the job scheduler node is configured to distribute the one or more other return calculation jobs to the return calculation node for execution in response to the return calculation node notifying the job scheduler node.

18. The system as recited in claim 17, wherein the return calculation node is configured to:
execute the one or more other return calculation jobs to generate the calculation results;
cache the calculation results in a local cache of the return calculation node; and
execute the return calculation job comprising accessing the calculation results from the local cache of the return calculation node.

19. The system as recited in claim 14, wherein the job scheduler node is configured to:
detect a new return calculation node on the network; and
add the new return calculation node to the plurality of return calculation nodes.

20. The system as recited in claim 14, wherein the job scheduler node is configured to:
detect that one of the plurality of return calculation nodes is an unavailable return calculation node that is not available to execute return calculation jobs; and
redistribute one or more return calculation jobs previously distributed to the unavailable return calculation node among one or more others of the plurality of return calculation nodes.

21. The system as recited in claim 14, wherein the job scheduler node and the plurality of return calculation nodes are components of a return calculation mechanism, wherein the return calculation mechanism is a backend return processing mechanism for a network-based return processing program that provides a frontend user interface for submission of the returns by entities, wherein the entities include one or more of individuals and businesses.

22. The system as recited in claim 14, wherein the job scheduler node and the plurality of return calculation nodes are components of a return calculation mechanism, wherein the return calculation mechanism is a backend return processing mechanism for a network-based corporate return processing program that provides a frontend user interface for submission of the returns by the corporate entities.

23. The system as recited in claim 14, wherein the plurality of returns are tax returns.

24. A non-transitory computer readable storage medium comprising program instructions, wherein the program instructions are computer-executable to implement:
   receiving a plurality of tax returns to be calculated for a corporation having a hierarchy of corporate entities and to be filed with a plurality of tax authorities;
   decomposing the plurality of tax returns into a plurality of return calculation jobs based on the plurality of tax authorities and the hierarchy of corporate entities;
   distributing, by a job scheduler executing on the processor, the plurality of return calculation jobs among the plurality of return calculation nodes,
      wherein a return calculation node of the plurality of return calculation nodes receives a return calculation job of the plurality of return calculation jobs for execution,
      wherein the return calculation node identifies one or more dependencies by determining that execution of the return calculation job depends on calculation results of one or more other return calculation jobs of the plurality of return calculation jobs, the one or more other return calculation jobs being associated with at least one selected from a group consisting of a corporate entity in the hierarchy of corporate entities and a tax authority of the plurality of tax authorities,
      wherein the return calculation node notifies the job scheduler of the one or more dependencies, and
      wherein the job scheduler schedules the one or more other return calculation jobs to be allocated for processing in response to the return calculation node notifying the job scheduler;
   executing the plurality of return calculation jobs on the plurality of return calculation nodes to generate the calculation results for the plurality of return calculation jobs; and
   generating a plurality of calculated tax returns using at least a portion of the calculation results.

25. The non-transitory computer readable storage medium as recited in claim 24, wherein, in said decomposing the plurality of returns into the plurality of return calculation jobs, the program instructions are computer-executable to implement designating at least one of the plurality of returns as a separate return calculation job.

26. The non-transitory computer readable storage medium as recited in claim 24, wherein, in said decomposing the plurality of returns into the plurality of return calculation jobs, the program instructions are computer-executable to implement:
   decomposing one or more of the plurality of returns into two or more units of work; and
   designating each unit of work as a separate return calculation job.

27. The non-transitory computer readable storage medium as recited in claim 24, wherein, in said distributing the plurality of return calculation jobs among the plurality of return calculation nodes, the program instructions are computer-executable to implement distributing the one or more other return calculation jobs to the return calculation node for execution in response to the return calculation node notifying the job scheduler.

28. The non-transitory computer readable storage medium as recited in claim 27, wherein the program instructions are computer-executable to implement:
   executing the one or more other return calculation jobs on the return calculation node to generate the calculation results;
   caching the calculation results in a local cache of the return calculation node; and
   executing the return calculation job on the return calculation node comprising accessing the calculation results from the local cache of the return calculation node.

29. The non-transitory computer readable storage medium as recited in claim 24, wherein the program instructions are computer-executable to implement:
   detecting a new return calculation node on the network; and
   adding the new return calculation node to the plurality of return calculation nodes.

30. The non-transitory computer readable storage medium as recited in claim 24, wherein the program instructions are computer-executable to implement:
   detecting that one of the plurality of return calculation nodes is an unavailable return calculation node that is not available to execute return calculation jobs; and
   redistributing one or more return calculation jobs previously distributed to the unavailable return calculation node among one or more others of the plurality of return calculation nodes.

31. The non-transitory computer readable storage medium as recited in claim 24, wherein the plurality of returns are tax returns.

* * * * *